3,445,409
COMPOSITIONS CONTAINING TALL OIL PITCH AND EPOXY ETHER RESINS
Vincent Francis D'Agostino, South Huntington, N.Y., assignor, by mesne assignments, to Arizona Chemical Company, New York, N.Y., a corporation of Delaware
No Drawing. Continuation-in-part of application Ser. No. 282,600, May 23, 1963. This application Aug. 22, 1966, Ser. No. 573,855
Int. Cl. C08g 45/00, 45/12
U.S. Cl. 260—18                4 Claims

ABSTRACT OF THE DISCLOSURE

An epoxy resin composition consists essentially of a heat-cured blend of an epoxy ether resin, an amide of a polymeric fatty acid with an aliphatic polyamine, and a tall oil pitch containing about equal parts of fatty acids, rosin acids, and unsaponifiables.

---

This application is a continuation-in-part of application Ser. No. 282,600 filed May 23, 1963, now abandoned.

The present invention relates to novel resinous compositions suitable for use in casting and potting. More particularly, the present invention relates to novel resinous compositions containing tall oil pitch and epoxy ether resins, which compositions are suited for use in formulating calking compounds for preparing road beds of improved properties, for casting and potting, and especially for preparing castings and pottings characterized by good electrical properties.

Epoxy ether resins in general may be said to form tough polymers of good electrical resistance. These polymers are employed extensively as adhesive, casting, potting, cement patching and coating resins. Their high cost however, prevents their adaptation for some users where they might otherwise be employed.

While various extenders or diluents have been incorporated into epoxy ether resins heretofore for purposes of reducing the cost of the resin, the incorporation of such diluents for the most part dramatically and adversely affects important characterizing properties of epoxy ether resin. Further, many potential diluments are incompatible with epoxy ether resins or are at best rendered compatible with great difficulty. Normally, inorganic materials are incorporated to modify physical properties. These materials are not dissolved in the polyepoxide, they merely serve to add bulk and improve mechanical properties such as machinability. Typically, the incorporation of such materials as silica or talc in substantial amounts in epoxy ether resin coating compositions will adversely affect the rate of cure and the toughness and strength of the finish. In addition, the incorporation of some diluents or extenders, particularly in substantial amounts, will so adversely affect the electrical resistance of epoxy resins as to render them unsuited for some uses such as in some pottings and castings where electrical properties are important.

Accordingly, it is a principal object of the present invention to provide compatible extended epoxy resin ether compositions which may be cast and potted and which, when so cast and potted, are physically tough, easily machined and characterized by good electrical properties.

It is a further object of the present invention to provide an extended epoxy ether resin composition in which the extender is a by-product of limited known commercial value, which extender is compatible with such resins or may be readily rendered so.

Another object of this invention is to provide an extended epoxy ether resin composition in which the extender will not "sweat" out or tend to separate therefrom upon curing of the resin mixture.

These and other objects and advantages will be apparent from the description of the present invention set forth hereinbelow.

In accordance with the present invention, compositions are provided which comprise an epoxy ether resin characterized by an epoxy equivalence greater than 1, an amine containing polyamide having an amine equivalence greater than 2 and tall oil pitch.

The epoxy ether resin will be present in the composition based on 100 parts of a mixture of said resin and said tall oil pitch of from about 20 to about 80 parts of epoxy resin to 80 parts to about 20 parts of tall oil pitch. Preferably, the epoxy ether resin will be employed in amounts of from between 80 and 40 parts while the tall oil pitch will be employed in amounts of from between about 20 and 60 parts.

The epoxy ethers or resins suitable for use in the compositions of this invention contain glycidyl ether groups and are characterized by a 1, 2-epoxy equivalency in the average molecule of greater than 1 and usually about 2. By epoxy equivalency, reference is made to the average number of 1, 2-epoxy groups contained in the average molecule of the ether.

A preferred group of epoxy ethers contemplated for use in this invention is prepared by reacting a dihydric phenol with epichlorohydrin in alkaline solution. These products are in general viscous liquids at normal temperatures, i.e., room temperature. Illustrative of the various dihydric phenols useful in preparing these glycidyl ethers are the mononuclear phenols, like resorcinol, catechol, hydroquinone and the like; polynuclear phenols like bis-(4-hydroxyphenyl)-2,2-propane frequently identified as bis-phenol A, 4,4'- dihydroxybenzophenone, bis-(4-hydroxyphenyl)-1,1-ethane, bis-(4-hydroxyphenyl) - 1,1-isobutane, bis-(4-hydroxy-2-methylphenyl)-2,2-propane, bis - (2 - dihydroxynaphthyl) - methane, 1,5 - dihydroxynaphthalene and the like.

Suitable epoxy ether resins may be represented by the general formula

where the value of n is from 0 to 7, R is a divalent hydrocarbon radical of a dihydric phenol. The preferred phenol is bis-phenol A.

Other epoxy ethers contemplated include the polyglycidyl ethers of polyhydric alcohols such as the diglycidyl ether of enthylene glycol, propylene glycol, diethylene, glycol, mannitol and the like.

Tall oil pitch is a product of somewhat varied composition, dependent to some extent upon its source and processing conditions. Tall oil pitch typically is a dark brown (Gardner Color-1933—50% in benzene 12–15) product obtained from the fractionation of tall oil. Thus, in the production of distilled tall oil, tall oil rosin, and tall oil fatty acids, a crude tall oil is subjected to continuous fractional distillation employing equipment and procedures similar to those employed in the refining of petroleum. The crude tall oil enters a fractionating tower to remove high boiling constituents. These are withdrawn from the bottom of the fractionating tower and constitute the tall oil pitch contemplated for use in this invention. Normally, such pitch will contain about equal parts of fatty, acids, rosin acids and unsaponifiable matter. Illustratively, such a pitch may contain 29% fatty acids, 31% rosin acids and 33% unsaponifiable matter. These acids include esterified acids. Tall oil pitch has a lighter color than other available pitches and thus is uniquely applicable in casting and potting areas when compared with other commercial pitches. It is soluble for the most part in petroleum and aromatic solvents, thus facilitating its use as a diluent in accordance with the present invention.

In addition to tall oil pitch, epoxy ether and, if desired, various inorganic fillers and solvent vehicles, a curing agent for the epoxy ether resin will normally be employed.

The amine containing polyamides or polyamine polyamides contemplated for use in this invention are condensation products of polymeric fatty acids with aliphatic polyamines. Typically, these polyamides are soft resinous materials which may be described as viscous liquid. Materials of this general type are disclosed in U.S. Pat. 2,450,940, and those of more particular importance to this invention in U.S. Pat. 2,705,223, and in particular in column 2, lines 30 through 60 thereof. Typically, such polyamides may be prepared according to the process described in U.S. Pat. 2,379,413 from commercially available dimer acids (prepared from long chain 12-20 carbon atom unsaturated fatty acid) such as dioleic or dilinoleic including the dimer acids of mixtures of these acids such as are found in commercially available tall oil fatty acid, and polyfunctional amines such as diethylene triamine, triethylene tetramine, etc., in such a ratio as to prepare a polymeric material with an excess of amine groups.

The amine containing polyamide is normally employed in the compositions on the basis of approximately one active amine group to one active epoxide group, since an excess of epoxide normally results in a waste of active material while an excess of amine results in an alkaline product which for many purposes is undesirable. A range of .8-1.2 to 1 amine groups of epoxy group is suitable for most compositions contemplated by this invention. For the most part, the amine group to epoxy group ratio can also be expressed in terms of relative weight ratios. Thus, preferably the amine containing polyamide and the epoxy ether resin are employed in relative weight ratios of about 1 to 1, thought weight ratios of from about .8 to about 1.2 to 1, respectively, may be employed.

The latitude in the relative ratio of amine group and epoxy group is primarliy due to the fact that the tall oil pitch contains some carboxy groups which are reactive with the epoxy groups and for that matter with amine groups.

In addition to resulting in compatible compositions, the polyamine-polyamides are curing agents for the epoxide ethers and thus the compositions of this invention do not require the use of conventional amine curing agents such as ethylene diamine, diethylene triamine, though these materials may be employed also if desired.

As noted above, various solvents may be employed to dilute the compositions of this invention and render them more workable. Such solvents include the conventional hydrocarbon solvents such as naphtha, benzene, xylenes, the chlorinated hydrocarbons, and even the use of reactive diluents such as styrene oxide are contemplated.

In order to illustrate the present invention, the following examples are given primarily by way of illustration. No specific details or enumerations contained therein should be construed as limitations on the present invention except insofar as they appear in the appended claims.

In Table I hereinbelow, reference is made to compatibility. This test was carried out by simply mixing the materials reported in Table I in a test tube. If a single clear phase resulted, the materials were considered compatible and sheets were cast for testing. As noted earlier, if materials are incompatible they are expressed or sweat out during curing of the resin and adversely affect the properties of the final product.

In preparing the castings for testing, the epoxide ether resin, the curing agent and the tall oil pitch were blended at room temperature so that a minimum of air was entrapped. The blend was then placed in a vacuum desiccator in a large bottle and the pressure reduced to about 1 millimeter. The blend foamed and care was exercised so that the foam remained within the bottle. After a brief period, further air was not released and the foam was collapsed.

These blends were then cast into sheets of approximately ⅛ inch in thickness by casting the blend into a suitable cavity and curing at 80° C. for two hours.

The samples after casting were evaluated for gross physical properties and for electrical properties.

EXAMPLES 1-9

Examples 1-9 were carried out in accordance with the procedure described above employing the components identified in Table I in the amounts there reported.

TABLE I.—Compatible Formulations

| Examples [1] | 1 | 2 | 3 | 4 | 5 | 6 | 7 | 8 | 9 |
|---|---|---|---|---|---|---|---|---|---|
| Epoxide A [2] | 100 | 100 | 100 | 100 | 100 | | | | |
| Diethylenetriamine | 11 | | | | | | | | |
| Polyamide-Polyamine Resin [3] | 100 | 100 | 100 | 100 | 100 | 100 | 100 | 100 | 100 |
| Epoxide B [4] | | | | | | 100 | 100 | 100 | 100 |
| Tall Oil Pitch | | | 67 | 200 | 800 | | 67 | 200 | 800 |
| Cure | (5) | (6) | (6) | (6) | (6) | | (6) | | |

[1] Antifoaming agent used as 1% in polyamide-polyamine resin when necessary.
[2] Bis glycidyl ether of bis phenol A, i.e., 2, 2-bis(4-glycidyloxy)phenyl) propane.
[3] Dimer acid of tall oil fatty acids (essentially a 1=1 mixture of oleic and linoleic acid) reacted with diethylene triamine. This resin has an amine value of 345, a viscosity as determined with a Brookfield Viscometer Model RVF at 75° C. of 8 poises, a percent ash by weight of 0.01%, a specific gravity 25° C./25° C. of 0.97, weighs 8.1 pounds/gallon at 25° C. and a flash point ° C. ASTM D92 of 265° C. The amine value reported is the number of milligrams of KOH to the amine alkalinity present in a one gram sample.
[4] Oil modified polyepoxide.
[5] 30°.
[6] 2 Hrs., 80° C.

Table I demonstrates that tall oil pitch is compatible with epoxy ether resins over a relatively wide range. In the formulas of Examples 3-5 the pitch is brought into solution with the epoxy ether resin by means of the polyamide polyamine resin. The qualitative properties of the formulations of thse examples appear good, as will be seen hereinafter. Employing pitch at a 33% level produced a product having excellent properties, as will be evident from the test data presented hereinafter. As the amount of pitch is increased, Examples 4 and 5, gross physical properties fall off.

Three formulations identical with that of Example 1, but containing 37, 113.5 and 341 parts of tall oil pitch were incompatible and were not cured.

Sample castings of those prepared in selected examples reported in Table I were further tested for electrical and physical properties. The results of this testing are reported in Table II below.

and epichlorohydrin in an alkaline solution, and the polyamide-polyamine curing agent has approximately an active

TABLE II.—ELECTRICAL PROPERTIES OF PITCH-EPOXY BLENDS AND CONTROLS

| Sample | Thickness, mils. | Surface,ᵃᶜ ohm/cm. | Volume,ᵃᶜ ohm/cm. | Surface ᵇᶜ | Volume ᵇᶜ | Dielectric Constant ᵃ | | |
|---|---|---|---|---|---|---|---|---|
| | | | | | | 60, c.p.s. | 10³, c.p.s. | 10⁶, c.p.s |
| Cast from Formula of Example 1 | 144 | 5.8×10¹⁵ | 1.6×10¹⁶ | 4.6×10¹⁵ | 9.4×10¹⁵ | 4.13 / ------ | 4.24 / 4.25 | 3.85 / 3.85 |
| Cast from Formula of Example 2 | 133 | 7.0×10¹⁵ | 1.3×10¹⁵ | >7.0×10¹⁵ | 5.0×10¹² | 3.21 / ------ | 3.30 / 3.32 | 3.06 / 3.07 |
| Cast from Formula of Example 3 | 133 | >7.0×10¹⁵ | 3.3×10¹⁵ | 3.4×10¹⁴ | 1.1×10¹³ | 3.08 / ------ | 3.19 / 3.19 | 2.97 / 2.98 |

| Sample | Dissipation Factor | | | Thickness, mils. | Short Time ᵃ Break-down, kv. | Volts/mil.ᵃ | Water, abs. percent |
|---|---|---|---|---|---|---|---|
| | 60, c.p.s. | 10³, c.p.s. | 10⁶, c.p.s. | | | | |
| Cast from Formula of Example 1 | 0.0027 / ------ | 0.0084 / 0.0084 | 0.030 / 0.031 | 146 / 146 / 146 | 53 / 54 / 53 | 363 / 370 / 363 | ---- / .12 / ---- |
| Cast from Formula of Example 2 | 0.0054 / ------ | 0.0092 / 0.0095 | 0.022 / 0.023 | 134 / 137 / 142 | 67 / 69 / 65 | 500 / 504 / 458 | ---- / .33 / ---- |
| Cast from Formula of Example 3 | 0.012 / ------ | 0.011 / 0.011 | 0.020 / 0.019 | 133 / 130 | 64 / 65 | 481 / 500 | ---- / .44 |

ᵃ 40 hrs. at 23° C., 50% relative humidity.
ᵇ Condition 1 plus 96 hrs. at 35° C., 90% relative humidity.
ᶜ Impressed voltage: 500.

The physical test results on selected samples are set forth in Table III below.

TABLE III.—PHYSICAL TEST RESULTS SAMPLE CAST FROM FORMULA

| | Example | | | |
|---|---|---|---|---|
| | 1 | 2 | 3 | 6 |
| Flexural St | 19,600 | 13,400 | 9,600 | |
| Tensile St | 10,800 | 7,300 | 5,300 | 89 p.s.i. |
| Young's Modulus | .59×10⁶ | .33×10⁶ | .25×10⁶ | |
| Percent Elongation | 2.4 | 3.3 | 4.4 | 77%. |
| Impact | .22±.03 | .85±.29 | .51±.09 | |
| Hardness | 83 | 57±2 | 15±3 | |
| Heat Distortion, ° C | 59 | 58 | 50 | |
| Brittle Point | | | | −6° C. |

Tables II and III above demonstrate that the pitch filled epoxy ether resins are characterized by good strength properties and that in fact their electrical properties are improved. The low dielectric constant shows the reduced polarity of resins obtained by the addition of tall oil pitch.

I claim:

1. An epoxy resin consisting essentially of the product obtained by preparing a uniform blend of about 80 to 120 parts by weight of the amide of polymeric higher fatty acids with excess aliphatic polyamines and about 25 to 400 parts by weight of a tall oil pitch containing about equal parts of fatty acids, rosin acids and unsaponifiables and having a Gardner color of 12–15 when measured in a 50% solution in benzene, admixing said blend uniformly with about 100 parts by weight of an epoxy ether resin having an epoxy equivalence greater than 1, and heat-curing the mixture.

2. A composition according to claim 1 in which the epoxide resin is prepared by reacting a dihydric phenol and epichlorohydrin in an alkaline solution, and the polyamide-polyamine curing agent has approximately an active amine group for each epoxy group of the ether resin and is the condensation product of a dimer acid of tall oil fatty acids with aliphatic polyamines.

3. A composition according to claim 2 in which the epoxide resin is 2,2-bis-(4-glycidyloxy)phenyl) propane and the polyamide-polyamine curing agent therefore is the dimer acid of a tall oil fatty acid condensed with diethylene triamine.

4. A composition according to claim 3 in which said epoxide resin is present in an amount of from 40 to 80 parts by weight based upon 100 parts of epoxide and tall oil pitch present.

References Cited

UNITED STATES PATENTS 3,277,052  10/1966  Thompson et al. _____ 260—28
3,190,845   6/1965  Goodnight _____ 260—28
2,824,078   2/1958  Mellick _____ 260—28

FOREIGN PATENTS 230,141   8/1960  Australia.
884,624  12/1961  Great Britain.

OTHER REFERENCES

Asphalts and Allied Substances, vol. I, 5th ed., Abraham, Van Nostrand, 1945, pp. 402–403.

DONALD E. CZAJA, Primary Examiner.

C. WARREN IVY, Assistant Examiner.

US. Cl. X.R.

260—24, 28